United States Patent [19]

Basu et al.

[11] 4,206,276

[45] Jun. 3, 1980

[54] CHALCOGENIDE ELECTROCHEMICAL CELL

[75] Inventors: Samarnath Basu, Philadelphia; Wayne L. Worrell, Narberth, both of Pa.

[73] Assignee: University Patents, Inc., Norwalk, Conn.

[21] Appl. No.: 943,107

[22] Filed: Sep. 18, 1978

[51] Int. Cl.$^2$ ............................................. H01M 4/58
[52] U.S. Cl. .................................. 429/218; 252/182.1
[58] Field of Search ...................... 429/218; 252/182.1

[56] References Cited

U.S. PATENT DOCUMENTS

| 4,009,052 | 2/1977 | Whittingham | 429/218 X |
| 4,041,220 | 8/1977 | Armand | 429/218 X |
| 4,049,879 | 9/1977 | Thompson et al. | 429/218 X |

*Primary Examiner*—Charles F. LeFevour

*Attorney, Agent, or Firm*—Scully, Scott, Murphy & Presser

[57] ABSTRACT

A battery is provided in which the anode contains an alkali metal in a high state of thermodynamic activity; the cathode comprises a partially alkali metal-intercalated chalcogenide of the formula $A_yMZ_x$ wherein A is an alkali metal more electropositive and larger than the anode alkali metal, M is a transition metal of Group IV or V, x is a numerical value of from about 1.8 to about 2.1, y is a numerical value of from about 0.01 to about 1 and Z is sulfur, selenium or tellurium; and the electrolyte comprises ions of the anode metal in a medium which is compatible with the anode and cathode allowing transport of the ion from anode to intercalate into the cathode.

In the discharged state the battery includes a cathode characterized by the presence of $A'_zA_yMZ_x$ in which A' is alkali metal more electronegative than A and z is a numerical value in the range $0 < z \leq 3.25$.

16 Claims, No Drawings

CHALCOGENIDE ELECTROCHEMICAL CELL

BACKGROUND OF THE INVENTION

This invention relates to the field of high energy batteries and particularly batteries based on the intercalation compounds of layered transition metal dichalcogenides.

Batteries composed of intercalatable transition metal chalcogenides as the cathode material are known in the art, as exemplified in U.S. Pat. No. 4,009,052 wherein are described alkali metal-based batteries using intercalatable transition metal disulfides such as titanium disulfide as cathode. Such batteries are secondary batteries as distinguished from primary batteries in that they are capable of being charged and discharged over many cycles. Specifically, these batteries are predicated on the use of an intercalated layered dichalogenide like $Li_xTiS_2$ (in which x varies from 0 to 1) as the cathodeactive material and lithium is intercalated or removed to and from the cathode respectively during discharging and charging of the battery. The limiting discharge condition of the battery of the said patent is reached when x approaches 1 as a value.

Thus, there is a need to increase the capacity of the dichalcogenide to intercalate the alkali metal which is transported through the cell to the cathode in order to realize higher capacity of the battery, primarily to obtain greater power from such batteries.

The present invention provides substantially higher capacity than that realized with the batteries of U.S. Pat. No. 4,009,052. For example, the capacity of batteries in accordance with the present invention is up to three times (per mole of the dichalcogenide) that of comparable batteries prepared in accordance with the aforesaid U.S. Pat. No. 4,009,052.

THE INVENTION

The present invention is based on the discovery that a partially alkali metal intercalated dichalcogenide cathode-active material has a greater capacity for anode alkali metal which is more electronegative and of smaller ionic size than the partially intercalated alkali metal, and the enhanced capacity of the said cathode-active material results in a substantial increase in power of batteries incorporating same in comparison to the power of batteries produced in accordance with the prior art, particularly U.S. Pat. No. 4,009,052.

Specifically, it has now been discovered that the use of a partially alkali metal (e.g. sodium) intercalated dichalcogenide cathode-active material in conjunction with an anode of another alkali metal (e.g. lithium) which is more electronegative and smaller in ionic size than that partially intercalated in the cathode enhances the capacity of the cathode for the anode metal. Thus, where the partially intercalated cathode material is of the formula $A_yMZ_x$ in which A is an alkali metal more electropositive than the anode metal, M is a transition metal of Group IV or V, Z is sulfur, tellurium or selenium, x is a numerical value of from about 1.8 to about 2.1 and y is a numerical value of from about 0.01 to about 1, the cathode-active material can be represented by the formula $A'_zA_yMZ_x$, wherein A' is a more electronegative and smaller alkali metal than A, z is a numerical value in the range of $0 < z \leq 3.25$ and A, Y, M, Z and x are as previously defined.

Thus the present invention provides for higher maximum intercalated anode alkali metal than is possible utilizing the teachings of the aforementioned U.S. Pat. No. 4,009,052. In the latter, the maximum number of gramatoms of intercalated anode metal is one, whereas in the present invention, the comparable number is about three, per mole of dichalcogenide.

The invention will be described further in terms of the battery components.

THE CATHODE

The cathode-active material of the battery consists of a partially intercalated transition metal dichalcogenide of the formula $A_yMZ_x$ in which A is at least one alkali metal which is more electropositive and larger in size that the anode-active metal, M is at least one transition metal of Group IV or V, Z is at least one of sulfur, selenium, or tellurim, x has a numerical value of from about 1.8 to about 2.1, and y has a numerical value of from about 0.01 to about 1, preferably from about 0.15 to about 0.2.

The cathode may consist entirely of the cathodeactive material acting simultaneously as the current collector as well. Alternatively, as in well known in the art, the cathode may consist of the cathode active material supported on a suitable base structure such as stainless steel, nickel, carbon and similar support materials.

The anode-active alkali metals (A') include lithium, sodium, potassium, and rubidium with lithium being preferred. The partially intercalated alkali metals (A) include sodium, potassium, rubidium, and cesium, or mixtures thereof, with sodium being preferred with the preferred anode (lithium).

The transition metals include tantalum, titanium, zirconium, hafnium, niobium and vanadium, of these the preferred being titanium and tantalum. Mixtures of the transition metal chalcogenides are also useful, e.g. titanium-tantalum sulfide. In general, sulfides are preferred of the chalcogenides particularly those wherein the value of x in the formula $MZ_x$ is about 2.

A typical cathode composition is $Na_{0.15-0.2}TiS_2$, e.g. $Na_{0.177}TiS_2$.

THE ANODE

The anode is comprised of alkali metals which are more electronegative and smaller in size than the partially intercalated alkali metal of the cathode-active material. Alloys of the alkali metals can be employed as anode, such as alloys with aluminum and silicon, as well as with other alkali metals. The anode-active alkali metals include Li, Na, K and Rb, and preferably is lithium. Thus, the anode-active alkali metal can be lithium when the partially intercalated alkali metal is sodium or a heavier alkali metal. Of course, the anode can be Na or K, if the partially intercalated alkali metal is Rb or Cs.

As with the cathode, the anode may be comprised entirely of the alkali metal, or it may be comprised of the alkali metal on a suitable support like nickel, aluminum, stainless steel or similar supports.

A typical anode is lithium when the cathode is an intercalate of sodium.

THE ELECTROLYTE

The electrolyte comprises a medium containing anode metal ions which is physically and chemically compatible with both the anode and cathode of the battery. It may be solid or liquid offering rapid transport of anode-active metal ions to and from the cathode, respectively, in discharging and charging cycles, i.e., during intercalation and removal of anode metal from the partially alkali metal-intercalated transition metal dichalcogenide.

Liquid electrolyte systems, which are usually preferred, are prepared by dissolving of the selected salt in suitable solvents. Typically, salts include alkali metal (A') salts such as $A'ClO_4$, $A'PF_6$ and other similar salts known to the art wherein A' is the anode-active slakli metal. Mixtures of electrolytic salts can be employed as is common. The solvents for such electrolytic systems include porpylene carbonate, tetrahydrofuran, dioxane, dioxolane, dimethoxyethane, ethylene carbonate and like solvents. The solvents may be employed alone or in mixture with other solvents, or inert diluent solvents. Both the electrolyte and solvent therefor are well-known in this art.

A typical liquid electrolyte system can be prepared by dissolving lithium perchlorate in propylene carbonate.

In commonly assigned copending application Ser. No. 891,807, filed Mar. 30, 1978, there is described the improvement in the performance of organic aprotic-based electrolytes mentioned herein by incorporation of crown ethers (macroheterocyclic compounds) into the electrolytes. These additives can be employed in preparing the cell electrolyte for the present invention and the disclosure of the said copending application is incorporated herein by reference.

It is also within the scope of the invention to use electrolytes in the solid, or fused state. For example, for the solid state, and "alumina can be used whereas, for fused electrolyte, alkali metal halides can be employed, e.g., LiCl-KCl mixtures.

The foregoing description, of course, refers to the anode, cathode, and electrolyte in the charged state, i.e. on assembly as an electrochemical cell, it will discharge.

The novel cathode of the present invention in the charged state is characterized by the presence of the partially alkali metal-intercalated dichalcogenide and can be used in any arrangement with a suitable anode, i.e. an anode of an alkali metal which is more electronegative and smaller in size than the alkali metal of the cathode-active material. Thus the present high-energy density cathode can be used for electrochemical cells in a variety of physical arrangements in conjunction with the suitable anode as long as provision is made for transport of the anode metal ions to the cathode in discharge and from the cathode in charging. The resulting batteries show a high energy output compared to known batteries by virtue of the higher capacity of the cathode for the anode metal, as hereinbefore described.

It may be convenient to produce a cathode for a battery so that the battery is in the discharged state in which case the anode is comprised of the mixed alkali metal-intercalated dichalcogenide, $A'_zA_yMZ_x$, wherein A and A' are each alkali metal with A being more electropositive and larger than a'
M = transition metal of Group IV or V
Z = S, Se or Te
x = numerical value from about 1.8 to 2.1
y = numerical value from about 0.01 to 1
z = numerical value in the range $0 < z \leq 3.25$.

While the concentration (z) of the second alkali metal (A') in the mixed alkali metal dichalcogenide can be any value greater than zero up to about 3.25, i.e., the range $0 < z \leq 3.25$, normally, a concentration of at least about $1 \times 10^{-3}$ is preferred for most uses. On charging, the cathode-active material is generated by transfer of alkali metal A' from cathode to anode, leaving the requisite $A_yMZ_x$ as the residual material of the cathode for discharge. The anode for the discharged battery can be simply a current-collecting structure which serves as support for the anode alkali metal, as described hereinbefore. The support, on charging of the battery, should be capable of receiving the anode alkali metal. Where the mixed alkali metal-intercalated dichalcogenide is fully intercalated, sufficient anode alkali metal would be generated for the anode to make it unnecessary that the anode contain additional anode alkali metal, although the anode can be provided with such additional alkali metal, as desired.

The electrolyte and electrolyte system for the battery in the discharged state can be any of the electrolytes and electrolyte systems employed in the battery in the charge state, as described hereinbefore.

For commercial production, in particular, it is convenient to assemble the battery in the discharged state since such assembly obviates a difficulty inherent in the use of alkali metals as the anode material due to sensitivity to moisture and oxygen of the atmosphere (normally requiring inert, dry atmosphere for assembly).

The novel and useful mixed alkali metal-intercalated dichalcogenide is especially valuable in permitting the assembly of the new high energy density cells of the present invention. These new products are preparable by various procedures, including electrolytic methods wherein $A_yMZ_x$ is employed as cathode and a source of A' is present to result in transfer of A' to the cathode active material. Additionally, the present new products can be prepared by reaction of $A_yMZ_x$ in suitable solvents with alkali metal (A') derivatives such as butyl lithium, sodium naphthalide, and similar such compounds. The mixtures are allowed to stand for extended periods, e.g., one to several days, after which the products are recovered from the solvent after filtration. Alternatively, these products can be prepared from the dichalcogenide $MZ_x$ in a two-step reaction in the first step of which the alkali metal (A) is reacted with $MZ_x$ in a reaction solvent, using selected amounts of the A alkali metal compound, (e.g., Na naphthalide) to form the intercalated dichalcogenide, $A_yMZ_x$, which is then separated in solvent from the reaction mixture and reacted with the aforesaid A' alkali metal derivative to form the products of the invention.

The stoichiometry of the initial reaction to form $A_yMZ_x$ must be controlled to provide y atoms of A in the intermediate. The product $A_yMZ_x$ is easily analyzed to determine the value of y using art-recognized procedures, e.g., titration with standard acid.

The following examples further illustrate the invention:

EXAMPLE 1

Tantalum disulfide was annealed at 580° C. for 7 days in the presence of sulfur vapor in a stream of argon. This procedure converted tantalum disulfide close to the stoichiometric formula, $TaS_2$, having a 2H-polytype structure.

About 11.2 g of this powder was intercalated with sodium by bringing it into contact with sodium naphthalide in tetrahydrofuran. The resulting composition of the sodium intercalated product was $Na_{0.177}TaS_2$. The intercalation and all subsequent operations were carried out under an argon atmosphere.

Five cells were constructed using the powder product as cathode-active material. For this purpose, the powder was pressed in a steel die into 0.25 inch diameter pellets weighing 116, 155, 80, 120 and 96 mg., respectively.

In the construction of each cell, one of these pellets was used as cathode by placing the pellet between a porous nickel felt metal disc and a stainless steel rod of 0.25 inch diameter, electrically connected to the cell cathode terminal of the measuring instrument.

The cell anode was made up of freshly cut lithium metal pieces of about 0.25 inch diameter in a stainless steel block.

ELECTROLYTE SYSTEM

Propylene carbonate was shaken with freshly cut lithium pieces of small size, (250 ml. of solvent, and 2-3 g lithium pieces (freshly cut) of 1-5 mm² surface area per peice: shaking was for 3 weeks). Filtration of the fragmented lithium pieces gave oxygen and moisture-free propylene carbonate.

Anhydrous lithium perchlorate (dried under vacuum at 140° C. for 7 days) was dissolved in the propylene carbonate at 0.7 mole/liter for the cell electrolyte.

THE DISCHARGE CHARACTERISTICS OF THE CELL

All the 5 cells were discharged to different extents by passing a current 0.315 mA/cm² of cathode area through the cells over various periods of time, after which they were allowed to relax and the voltages recorded. The extent of discharge, which is indicated by the extent of intercalation of lithium into the cathode is expressed by the composition parameter, z, in $Li_zNa_{0.177}TaS_2$.

Table I shows the various voltage values corresponding to the extent of discharge expressed as numerical value of z. The same table shows the voltage values of other cathodes like $Li_zTaS_2$ and $Li_zTiS_2$ (described in U.S. Pat. No. 4,009,052) as a function of z.

The data for the present invention clearly establishes the superiority of the $Li_zNa_{0.177}TaS_2$ cathode over that of U.S. Pat. No. 4,009,052 in intercalating more than 3 times lithium per mole of disulfide. The cathode of the present invention improves the capacity of the lithium battery significantly over the $Li/TiS_2$ cathode of U.S. Pat. No. 4,009,052.

After being discharged, the cathode of the cells were charged afterwards up to z=0.2 in $Li_zNa_{0.177}TaS_2$ and discharged again. The rechargibility of the cathode was excellent and same voltage values were reproduced corresponding to specific values of z.

Because of the relative differences in the extent of electronegativity of sodium ion and lithium ion, during charging of the cell, lithium comes out of the cathode and not sodium, up to the extent of charge represented by z=0. Even if the charging is continued beyond z=0, which would lead to the expulsion of sodium ions from the cathode, during subsequent discharging of the battery, all the sodium would be intercalated first into the cathode (because of its lower electronegativity than lithium) before any lithium is intercalated. That would in effect regenerate the $Na_yTaS_z$ cathode with which the battery was set up initially.

TABLE I

| Extent of discharge expressed as 'z' | Voltage (± 0.1) This Invention | Voltage $Li/TiS_2$ | Voltage $Li/TaS_2$ |
|---|---|---|---|
| 0.2 | 2.48 | 2.68 | 2.62 |
| 0.6 | 2.18 | 2.37 | 2.04 |
| 1.0 | 2.06 | 2.05 | 1.46 |
| 1.4 | 2.04 | Discharge does not go beyond z = 1.0 | Discharge does not go beyond z = 1.0 |
| 1.8 | 2.00 | " | " |
| 2.2 | 1.96 | " | " |
| 2.6 | 1.92 | " | " |
| 3.0 | 1.80 | " | " |

EXAMPLE II

Stoichiometric $TiS_2$ (Cerac/Pure Inc., Butler, Wisconsin) was intercalated with an aliquot of sodium naphthalide in tetrahydrofuran by allowing the mixture to stand for 2 days at room temperature under dry, inert atmosphere to obtain $Na_{0.177}TiS_2$. Titration with standard acid was used to determine the sodium content.

Thereafter, the $Na_{0.177}TiS_2$ was employed in a battery as described in Example I for the analogous tantalum compound with comparable results as shown in Table II.

TABLE II

| $Li_z Na_{0.177} TiS_2$ System | |
|---|---|
| Extent of Discharge expressed as 'z' | Voltage (± 0.1) (Volts) |
| 0.623 | 2.46 |
| 1.023 | 2.26 |
| 1.33 | 2.27 |
| 1.726 | 1.98 |
| 2.49 | 2.05 |
| 2.773 | 1.85 |

In the foregoing examples, the electrolytic solvent system employed is first equilibrated with the anode-active metal particularly lithium metal, to remove moisture and oxygen. When solvents so-treated are employed in an electrochemical cell, higher voltage is realized apparently due to improved anode performance. In comparison, the use of such solvents when treated by standard techniques such as with activated alumina treatment, distillation under reduced pressure and the like is not accompanied by the improved anode performance as evidenced by lower voltage values. Accordingly, the treatment of solvent with anode metal prior to use in the electrochemical cells of this invention constitutes a particularly preferred embodiment.

In the foregoing disclosure, reference has been made to alkali metals as the preferred anode-active materials and as the preferred partial intercalate. It is also intended that other electrochemically-active metals can be employed in the present invention, with the proviso that they can perform as is required of alkali metals designated A and A'. Thus, combinations of such metals in lieu of the corresponding alkali metals will of course result in suitable electrochemical cells in accordance with the invention. Thus, combinations of metals from among Be, Mg, Ba, Ca and Sr can be employed, with the more electropositive and larger serving as the "A" component of the system and the less electropositive and smaller metal serving as the A' component.

Accordingly, a suitable system will comprise magnesium as the anode and titanium disulfide intercalated with calcium.

In the preferred form of the invention, the cathode-active material is the mixed alkali metal intercalated dichalcogenide, $A'_zA_yMZ_x$. The amount of anode metal intercalated is thus given by the value of z.

"z" is a numerical value which is based on the remaining number of available sites for A', the anodeactive metal, in the VanderWaal's gaps of the dichalcogenide after intercalation of A. The number of such sites will be predicated on the nature of the alkali metals A and A'. For example, up to 3.25 lithiums are accommodated in the dichalcogenide intercalated with sodium at a value of about 0.2. The maximum value of z will of course vary with the value of y (i.e., the concentration of A alkali metal) and the size of alkali metal A and can assume values greater than 3.25.

What is claimed is:

1. A cathode of an electrochemical cell in the discharged state, comprising a mixed alkali metal intercalated dichalcogenide of the formula $A'_zA_yMZ_x$ wherein:
   A and A' are each alkali metals with A being more electropositive and larger than A';
   M is at least one transition metal from Group IV or V;
   Z is sulfur, selenium or tellurium;
   x is a numerical value from about 1.8 to about 2.1;
   y is a numerical value from about 0.01 to 1; and
   z is a numerical value in the range $0 < z \leq 3.25$.

2. A cathode according to claim 1 wherein A' is lithium.

3. A cathode according to claim 1 wherein A is sodium.

4. A cathode according to claim 1 wherein A is sodium and A' is lithium.

5. A cathode according to claim 4 wherein Z is sulfur.

6. A cathode according to claim 5 wherein M is tantalum.

7. A cathode according to claim 5 wherein M is titanium.

8. A composition of the formula $A_yA'_zM.Z_x$ wherein
   A and A' are each alkali metals with A being more electropositive and larger than A';
   M is at least one transition metal from Group IV or V;
   Z is sulfur, selenium or tellurium;
   x is a numerical value from about 1.8 to about 2.1;
   y is a numerical value from about 0.01 to 1; and
   z is a numerical value in the range $0 < z \leq 3.25$.

9. A composition according to claim 8 wherein A is sodium.

10. A composition according to claim 8 wherein A' is lithium.

11. A composition according to claim 8 wherein A is sodium and A' is lithium.

12. A composition according to claim 8 wherein Z is sulfur.

13. A composition according to claim 8 wherein M is tantalum.

14. A composition according to claim 8 wherein M is titanium.

15. A composition of the formula $Na_{0.177}Li_zTiS_2$ wherein z is a numerical value from about $10^{-3}$ to about 3.25.

16. A battery in the discharged state wherein the cathode comprises a mixed alkali metal intercalated dichalcogenide of the formula $A'_zA_yMZ_x$ wherein
   A and A' are each alkali metals with A being more electropositive and larger than A';
   M is at least one transition metal from Group IV or V;
   Z is sulfur, selenium or tellurium;
   x is a numerical value from about 1.8 to about 2.1;
   y is a numerical value from about 0.01 to 1; and
   z is a numerical value in the range $0 < z \leq 3.25$ and said battery further including an electrolyte comprising a salt of A' so that on battery charging A' forms as the anode-active material.

* * * * *